United States Patent
Dane et al.

(10) Patent No.: US 8,861,601 B2
(45) Date of Patent: Oct. 14, 2014

(54) ENCODER-ASSISTED ADAPTIVE VIDEO FRAME INTERPOLATION

(75) Inventors: Gokce Dane, La Jolla, CA (US); Khaled Helmi El-Maleh, San Diego, CA (US); Yen-Chi Lee, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 1537 days.

(21) Appl. No.: 11/112,531

(22) Filed: Apr. 22, 2005

(65) Prior Publication Data

US 2006/0039471 A1 Feb. 23, 2006

Related U.S. Application Data

(60) Provisional application No. 60/602,698, filed on Aug. 18, 2004.

(51) Int. Cl.
```
H04N 7/18       (2006.01)
H04N 19/61      (2014.01)
H04N 19/46      (2014.01)
H04N 19/587     (2014.01)
H04N 19/172     (2014.01)
H04N 19/132     (2014.01)
H04N 19/51      (2014.01)
```

(52) U.S. Cl.
CPC ... *H04N 19/00545* (2013.01); *H04N 19/00781* (2013.01); *H04N 19/00751* (2013.01); *H04N 19/00266* (2013.01); *H04N 19/00127* (2013.01); *H04N 19/00587* (2013.01)
USPC ............ 375/240.16; 375/240.17; 375/240.27; 375/240.25

(58) Field of Classification Search
CPC ...... H04N 7/50; H04N 7/26244; H04N 5/145
USPC ..................... 375/240.01–240.29
See application file for complete search history.

(56) References Cited

U.S. PATENT DOCUMENTS 5,113,255 A  5/1992  Nagata et al.
5,517,245 A  5/1996  Kondo et al.
(Continued)

FOREIGN PATENT DOCUMENTS

JP    2298184 A    12/1990
JP    3029477 A     2/1991
(Continued)

OTHER PUBLICATIONS

Bruijn, F.J., et al. (2002) Efficient video coding integrating MPEG-2 and picture-rate conversion. IEEE Transactions on Consumer Electronics, vol. 48(3):688-693.

(Continued)

*Primary Examiner* — Andy Rao
(74) *Attorney, Agent, or Firm* — Brent A. Boyd

(57) ABSTRACT

The disclosure is directed to techniques for encoder-assisted adaptive interpolation of video frames. According to the disclosed techniques, an encoder generates information to assist a decoder in interpolation of a skipped video frame, i.e., an S frame. The information permits the decoder to reduce visual artifacts in the interpolated frame and thereby achieve improved visual quality. The information may include interpolation equation labels that identify selected interpolation equations to be used by the decoder for individual video blocks. As an option, to conserve bandwidth, the equation labels may be transmitted for only selected video blocks that meet a criterion for encoder-assisted interpolation. Other video blocks without equation labels may be interpolated according to a default interpolation technique.

36 Claims, 10 Drawing Sheets

(56) References Cited

U.S. PATENT DOCUMENTS

| | | | |
|---|---|---|---|
| 6,049,570 A * | 4/2000 | Fukunaga et al. | 375/240.12 |
| 6,192,079 B1 * | 2/2001 | Sharma et al. | 375/240.16 |
| 6,295,089 B1 * | 9/2001 | Hoang | 348/390.1 |
| 6,970,506 B2 * | 11/2005 | Kim et al. | 375/240.01 |

FOREIGN PATENT DOCUMENTS

| | | |
|---|---|---|
| JP | 6152432 A | 5/1994 |
| JP | 10271508 A | 10/1998 |
| JP | 2001204033 | 7/2001 |
| JP | 2004032355 | 1/2004 |
| WO | 0116821 | 3/2001 |
| WO | 03053066 | 6/2003 |
| WO | WO03079681 A1 | 9/2003 |

OTHER PUBLICATIONS

Chen, Y., et al. (1998) Frame-rate up-conversion using transmitted true motion vectors. IEEE Second Workshop on Redondo Beach, CA, USA, Dec. 7-9. ISBN: 0-7803-4919-9, pp. 622-627.

Dane, G., et al. (2005) Encoder-assisted adaptive video frame interpolation. IEEE International Conference on Philadelphia, Penn., USA, Mar. 18, ISBN: 0-7803-8874-7, pp. 349-352.

International Search Report—PCT/US2005/029649. International Search Authority—European Patent Office—Dec. 22, 2003.

Written Opinion—PCT/US2005/029649, International Search Authority—European Patent Office—Dec. 22, 2003.

Translation of Office Action in Japan application 2007-528067 corresponding to U.S. Appl. No. 11/112,531, citing JP2004032355 dated Feb. 1, 2011.

* cited by examiner

FIG. 4A  FIG. 4B  FIG. 4C

ENCODER-ASSISTED ADAPTIVE VIDEO FRAME INTERPOLATION

This application claims the benefit of U.S. Provisional Application No. 60/602,698, filed Aug. 18, 2004, the entire content of which is incorporated herein by reference.

TECHNICAL FIELD

The disclosure relates to digital video encoding and decoding and, more particularly, techniques for interpolation of skipped frames for applications such as frame rate conversion

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved transmission efficiency of video sequences by encoding data in a compressed manner. Compression reduces the overall amount of data that needs to be transmitted for effective transmission of video frames.

The MPEG-4, ITU H.263 and ITU H.264 standards, for example, support video encoding techniques that utilize similarities between successive video frames, referred to as temporal or Inter-frame correlation, to provide Inter-frame compression. The Inter-frame compression techniques exploit data redundancy across frames by converting pixel-based representations of video frames to motion representations. Frames encoded using Inter-frame techniques are referred to as P ("predictive") frames or B ("bi-directional") frames. Some frames, referred to as I ("intra") frames, are encoded using spatial compression, which is non-predictive.

In order to meet low bandwidth requirements, some video applications, such as video telephony or video streaming, reduce the bit rate by encoding video at a lower frame rate using frame skipping. An intentionally skipped frame may be referred to as an "S" ("skipped") frame. Unfortunately, low frame rate video can produce artifacts in the form of motion jerkiness. Therefore, frame interpolation, also known as frame rate up conversion (FRUC), is typically used at the decoder to interpolate the content of intentionally skipped frames.

A variety of FRUC techniques have been developed, and can be divided into two categories. A first FRUC category includes frame repetition (FR) and frame averaging (FA), which both use a combination of video frames without consideration of motion. These algorithms provide acceptable results in the absence of motion. When there is significant frame-to-frame motion, however, FR tends to produce motion jerkiness, while FA produces blurring of objects.

A second FRUC category relies on advanced conversion techniques that employ motion. In this category, the quality of an interpolated frame depends on the difference between estimated motion and true object motion. In typical FRUC applications, the decoder obtains motion information for an interpolated frame from motion information for adjacent frames. However, the motion vectors of an S frame that are obtained directly from the motion vectors of adjacent frames are not sufficiently accurate and can result in various artifacts in interpolated frames. Also, for Intra-coded blocks, there is no motion information available to use for interpolation of S frames, generally requiring additional estimation or processing overhead at the decoder for reliable interpolation.

SUMMARY

The disclosure is directed to techniques for encoder-assisted adaptive interpolation of video frames. According to the disclosed techniques, an encoder generates information to assist a decoder in interpolation of a skipped video frame, i.e., an S frame. The information permits the decoder to reduce visual artifacts in the interpolated frame and thereby achieve improved visual quality.

The information may include interpolation equation labels that identify selected interpolation equations to be used by the decoder for individual video blocks within an S frame to achieve better results. The information also may include forward motion vectors and difference information for the S frame.

As an option, to conserve bandwidth, the equation labels may be transmitted for only selected video blocks that meet a difference criterion for encoder-assisted interpolation. Other video blocks without equation labels may be interpolated according to default interpolation techniques at the decoder.

In one embodiment, the disclosure provides a video encoding method comprising generating information to assist a video decoder in interpolation of a skipped video frame, and encoding the information within a video frame for transmission to the video decoder.

In another embodiment, the disclosure provides a video decoding method comprising receiving information to assist in interpolation of a skipped video frame, wherein the information is encoded within a video frame, and applying the information to interpolate the skipped video frame.

In a further embodiment, the disclosure provides a video encoder comprising an analysis unit that analyzes a skipped video frame and generate information to assist a video decoder in interpolation of the skipped video frame, and an assembly unit that encodes the information within a video frame for transmission to the video decoder.

In an additional embodiment, the disclosure provides a video decoder comprising an interpolation unit that receives information to assist in interpolation of a skipped video frame, wherein the information is encoded within a video frame, and applies the information to interpolate the skipped video frame.

The disclosure also contemplates computer-readable media comprising instructions to cause one or more processors forming a video encoder or decoder to carry out any of the techniques described herein.

The details of one or more embodiments are set forth in the accompanying drawings and the description below. Other features, objects, and advantages will be apparent from the description and drawings, and from the claims.

BRIEF DESCRIPTION OF DRAWINGS

FIGS. 4A-4C are diagrams illustrating generation of equation flags and sum of absolute difference (SAD) flags to aid in adaptive interpolation.

DETAILED DESCRIPTION

Figure 1:
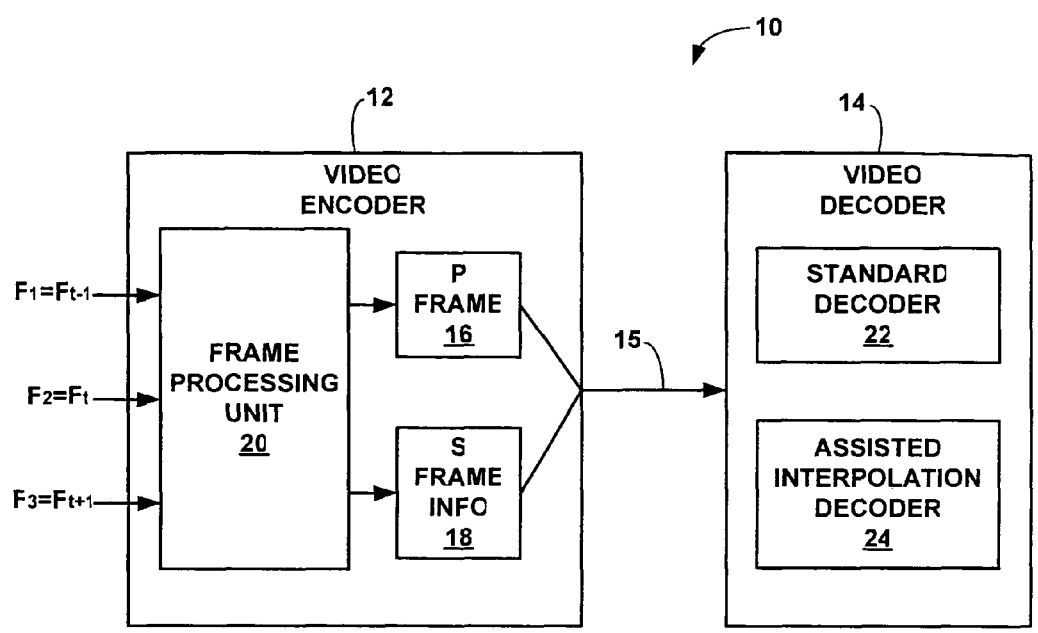
FIG. 1 is a block diagram illustrating a video encoding and decoding system employing an encoder-assisted adaptive interpolation technique in accordance with this disclosure.

FIG. 1 is a block diagram illustrating a video encoding and decoding system 10 configured to employ an encoder-assisted adaptive interpolation technique. As shown in FIG. 1, system 10 includes a video encoder 12 and a video decoder 14 connected by a transmission channel 15. Transmission channel 15 may be a wired or wireless medium. System 10 may support bi-directional video transmission, e.g., for video telephony. Accordingly, reciprocal encoding, decoding, multiplexing (MUX) and demultiplexing (DEMUX) components may be provided on opposite ends of channel 15. In some embodiments, encoder system 12 and decoder system 14 may be embodied within video communication devices such as wireless mobile terminals equipped for video streaming, video telephony, or both.

System 10 may support video telephony according to the Session Initiated Protocol (SIP), ITU H.323 standard, ITU H.324 standard, or other standards. Video encoder 12 generates encoded video data according to a video compression standard, such as MPEG-2, MPEG-4, ITU H.263, or ITU H.264. Although not shown in FIG. 1, video encoder 12 and video decoder 14 may be integrated with an audio encoder and decoder, respectively, and include appropriate MUX-DEMUX units to handle audio and video portions of a data stream. The MUX-DEMUX units may conform to the ITU H.223 multiplexer protocol, or other protocols such as the user datagram protocol (UDP).

Encoder 12 encodes P frame 16 and S frame information 18. P frame 16 is a predictive frame that includes sufficient information to permit video decoder 14 to decode and present a frame of video information. P frame is encoded with good fidelity. In particular, both motion vectors and quantized prediction error are encoded for the P frame. An S frame is a skipped frame that must be interpolated by decoder 14 to produce a frame of video information.

In accordance with this disclosure, encoder 12 does not actually encode and transmit an S frame. Instead, encoder 12 generates low-overhead S frame information 18 to assist video decoder 14 in interpolation of the S frame, and encodes the information in a video frame for transmission to the video decoder. The S frame information may be included in a dedicated frame, or added to a transmitted P frame. Interpolation of the S frame may support a FRUC technique at video decoder 14.

In the example of FIG. 1, video encoder 12 includes a frame processing unit 20 configured to process incoming frames $F_1$, $F_2$, $F_3$ of video information and decide whether to encode P frames 16 or information to assist in interpolation of S frames. $F_2$ represents the frame to be skipped, while frames $F_1$ and $F_3$ represent the previous and subsequent P frames, respectively.

Based on analysis of frames $F_1$, $F_2$, $F_3$, frame processing unit 20 determines whether to encode a P frame or encode S frame information 18. In the case of an S frame, frame processing unit 20 generates information to assist video decoder 14 in interpolation of the S frame. The information permits decoder 14 to reduce visual artifacts in the interpolated S frame and thereby achieve improved visual quality. Although the S frame is skipped, i.e., not transmitted to decoder 14, the S frame information supports interpolation of the contents of the S frame.

To handle both P frames and S frames, video decoder 14 includes a standard decoder 22 and an assisted interpolation decoder 24. Standard decoder 22 applies standard decoding techniques to decode each P frame 16. However, assisted interpolation decoder 24 relies on assistance from video encoder 12 to interpolate S frames. In particular, assisted interpolation decoder 24 receives S frame information 18 and applies the S frame information to interpolate the skipped video frame. The S frame information may include information selected to support more accurate interpolation of the S frame so that visual artifacts in the interpolated video information can be reduced.

S frame information 18 may include, for example, information that specifies a particular interpolation equation to be used by the video decoder 14 in interpolation of the S frame, or particular interpolation equations to be used for selected video blocks, e.g., macroblocks (MBs) or smaller blocks, within the S frame. After obtaining two sets of motion vectors, i.e., the backward (BW) motion vector $mv_{12}$ for the S-frame and the forward (FW) motion vector $mv_{23}$ for the next P frame, a set of interpolation techniques are tested to predict the S frame at encoder 12. Depending on complexity and bandwidth requirements for a given application, in some embodiments, more than two sets of motion vectors can be calculated and transmitted.

Subsequently, encoder 12 picks a label corresponding to the equation and sends the equation for a respective video block m, e.g., a 4×4, 8×8 or 16×16 pixel block within the S frame. A specified interpolation equation may be one of several different interpolation equations that could be used. However, frame processing unit 20 of video encoder 12 selects a particular interpolation equation that is expected to yield interpolation results that satisfy a desired level of quality for the S frame or a particular video block within the S frame.

A particular type of interpolation equation may be more effective, for a particular frame or video block, than other types of interpolation equations. Conversely, some frames or video blocks may have characteristics that require application of a different interpolation equation to achieve acceptable results. Accordingly, frame processing unit 20 may specify different interpolation equations for different video blocks within a given S frame. S frame information 18 provides assisted interpolation decoder 24 with sufficient information to apply the appropriate interpolation equations to interpolate video blocks within an S frame. In this manner, video encoder 12 assists decoder 14 in interpolation of the S frame.

In addition to interpolation equations, S frame information 18 may include other information useful in improving the quality of interpolation by video decoder 18. For example, S frame information 18 may further include motion vectors and difference information. The motion vectors represent motion between the skipped frame, a previous frame, and optionally a subsequent frame. The difference information indicates differences between the skipped frame, a previous frame, and a subsequent frame, or corresponding video blocks within the skipped frame, previous frame, and subsequent frame. The difference information may also include sum of absolute difference (SAD) flags.

To reduce the bandwidth requirements presented by S frame information 18, frame processing unit 20 may be configured to send information only for selected video blocks within an S frame. In particular, frame processing unit 20 may identify video blocks that appear to require a particular interpolation equation in order to provide acceptable video quality. Other video blocks may be interpolated accurately without the need for a particular interpolation equation. In some embodiments, frame processing unit 20 may determine differences between video blocks within the S video frame and corresponding video blocks within a previous video frame, subsequent video frame, or both, and identifies video blocks yielding differences that exceed a threshold value. Frame processing unit 20 then generates information that specifies particular interpolation equations to be used by video decoder 14 in interpolation of the identified video blocks within the S frame.

S frame information 18 may be encoded within a video frame that is dedicated to the S frame information and transmitted independently of P frame 16. Alternatively, S frame information 18 may be embedded within a P frame 16 that precedes or follows the S frame for transmission to decoder 14. In either case, S frame information 18 requires significantly less bandwidth than the actual content of the S frame. Accordingly, system 10 is able to take advantage of the bandwidth savings provided by frame skipping, yet provide improved video quality by encoder-assisted interpolation.

Video decoder 14 may be specially configured to recognize and make use of S frame information 18. For S frames, the macroblock (MB) mode is forced to be Inter. Because decoder 14 will have the macroblock mode (Inter) decision for the S frame, the macroblock decision units can be used to send S frame information 18 relating to the interpolation equations and SAD flags. If a video decoder 14 is not equipped to use S frame information 18, however, the information can be ignored, and interpolation can proceed according to a default interpolation technique otherwise applied by the video decoder.

Figure 2:
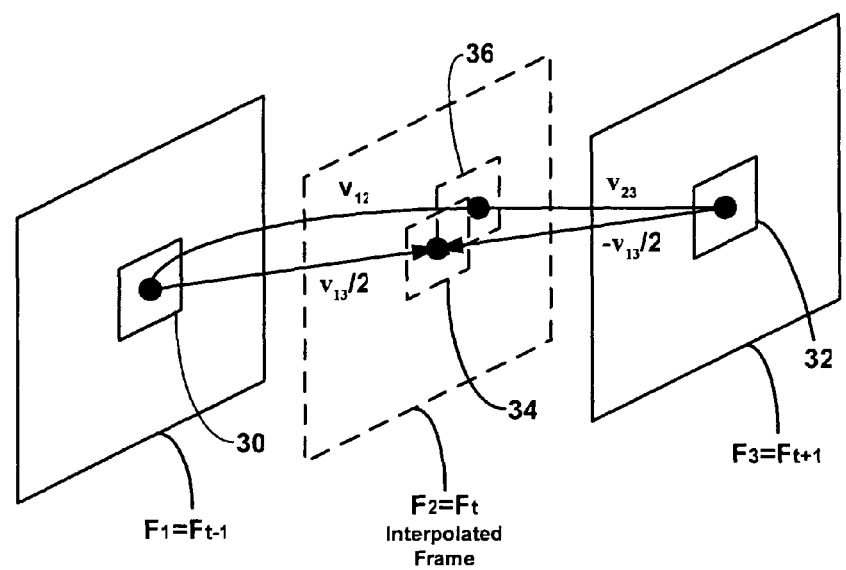
FIG. 2 is a diagram illustrating application of a motion compensated FRUC technique at a decoder using transmitted motion vectors.

FIG. 2 is a diagram illustrating application of a motion compensated FRUC technique at decoder 14 using motion vectors provided by encoder 12 as part of S frame information 18. In general, video decoder 14 applies S frame information 18 provided by video encoder 12 to interpolate S frames and support FRUC. In some conventional decoder-side FRUC techniques, a decoder 12 relies on a vector $v_{13}$ extending between a block 30 in frame F1 and a corresponding block 32 in frame F3. Frames $F_1$ and $F_3$ are frames that precede (t−1) and follow (t+1), respectively, an S frame $F_2=F_t$ that requires interpolation. The nomenclature of $F_1$, $F_2$, and $F_3$ may be generalized to $F_{t-1}$, $F_t$, and $F_{t+1}$ without loss of specificity. The vector $v_{13}$ is generally divided by two (for 1:2 frame rate conversion) to produce motion vectors $v_{13}/2$ and $-v_{13}/2$ and identify a corresponding block 34 in the S frame $F_2$. For 1:N conversion, the motion vectors should be scaled accordingly.

As shown in FIG. 2, however, the resulting block 34 may be substantially different from an actual corresponding block 36 in S frame $F_2$. Without the actual motion vector information, i.e., $v_{12}$, $v_{23}$, it is difficult to ascertain the actual block 36 for a decoder-side FRUC implementation. Consequently, interpolated frame quality depends heavily on the accuracy of the estimated motion vectors $v_{13}/2$, $-v_{13}/2$ relative to actual motion vectors $v_{12}$ and $v_{23}$. As a result, the decoder-side FRUC implementation may introduce undesirable visual artifacts such as blocking if only forward motion compensated frame is used, or blurring if both forward and backward motion compensated frames are used.

In contrast, S frame information 18 permits video decoder 14 to apply an encoder-assisted interpolation technique, in accordance with this disclosure. S frame information 18 may include actual motion vectors and other information determined at the encoder side to provide improved interpolation of S frame $F_2$ by decoder 14. Encoder 12 permits improved frame interpolation at decoder 14 by sending effective side information, i.e., S frame information 18, obtained by encoder processing. In this manner, video decoder 14 reduces various artifacts that would otherwise be introduced due to incorrect motion estimation in FRUC. In addition, with S frame information 18, additional processing ordinarily needed for FRUC motion estimation can be eliminated in video decoder 14, resulting in reduced implementation complexity.

Figure 3:
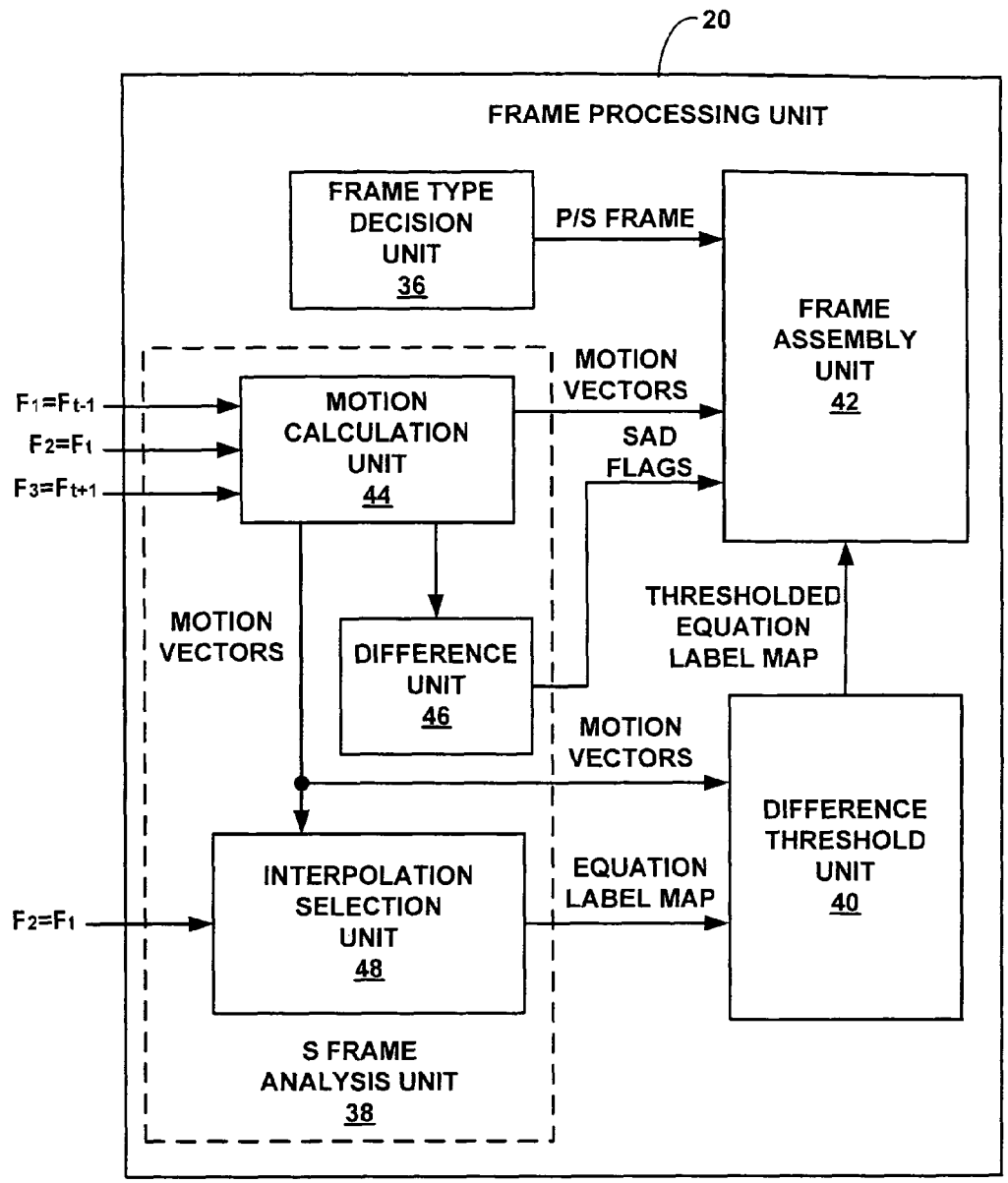
FIG. 3 is a block diagram illustrating a frame processing unit for use in a video encoder as shown in FIG. 1.

FIG. 3 is a block diagram illustrating a frame processing unit 20 for use in a video encoder 12 as shown in FIG. 1. As shown in FIG. 3, frame processing unit 20 includes frame type decision unit 36, S frame analysis unit 38, difference threshold unit 40 and frame assembly unit 42. S frame analysis unit 38 further includes motion calculation unit 44, difference unit 46, and interpolation selection unit 48. As will be described, S frame analysis unit 38 generates S frame information 18 to assist decoder 14 in interpolating an S frame with improved accuracy. In general, S frame analysis unit 38 analyzes an S frame to generate motion vectors, difference information, and interpolation equation selections for effective interpolation of video blocks within the S frame.

Frame type decision unit 36 determines whether an incoming video information should be encoded as a P frame or an S frame. The decision to skip a frame may be based in part on a uniform or non-uniform frame skipping function designed to reduce the overall amount of encoded information for bandwidth conservation across transmission channel 15 (FIG. 1). For example, frame type decision unit 36 may skip every nth frame, or skip a frame based on dynamic skipping criteria.

In some instances, frame type decision unit 36 may skip even-numbered frames. In either case, frame type decision unit 36 communicates the frame decision to frame assembly unit 42. The frame skipping decision also may be based on a peak signal to noise ratio (PSNR) or other objective visual quality metrics such as mean-square error from a previous reconstructed frame, as well as motion vector length correlated to the number of bytes spent for encoding of P frames.

As further shown in FIG. 3, S frame analysis unit 38 generates motion vectors, sum of absolute difference (SAD) flags, and an equation label map, each of which may form part of the S frame information 18 provided by encoder 12 to assist decoder 14 in interpolation. Motion calculation unit 44 generates motion vectors representing motion between video blocks within the skipped (S) frame $F_2$ and corresponding blocks within the preceding frame $F_1$ and subsequent frame $F_3$. Hence, each video block within the skipped frame may be characterized by a pair of motion vectors, i.e., a backward (BW) motion vector and a forward (FW) motion vector. These motion vectors assist interpolation selection unit 48 in selection of appropriate interpolation equations for video blocks within the S frame.

Difference unit 46 analyzes differences between video blocks in the skipped frame and corresponding video blocks within a subsequent frame. Although a motion vector may be determined between a skipped frame block and a substantially similar previous or subsequent frame block, the identified blocks still may exhibit significant differences in content. Difference unit 46 may determine the differences based on a sum of absolute difference (SAD) metric. The SAD metric may be determined for an entire macro block, four sides of the macroblock, e.g., 2 to 3 pixels wide, and boundaries between neighboring macroblocks. If the SAD metric value is very large, a reference can be taken from a future frame, rather than a previous frame, due to the possibility that objects may appear in the interpolated S frame. Difference unit 46 expresses the differences as difference flags, e.g., SAD flags, that aid decoder 14 in interpolation.

Interpolation selection unit 48 applies a set of different interpolation equations to video blocks within the skipped frame to identify the most effective interpolation equation in terms of interpolation accuracy. In particular, interpolation selection unit 48 evaluates results of different interpolation equations for particular video blocks within the video frame. Based on the results, interpolation selection unit 48 specifies particular interpolation equations to be used by video decoder 14 in interpolation of selected video blocks within the skipped video frame. From this process, different interpolation equations may be selected for different video blocks within the S frame.

In operation, interpolation selection unit 48 receives BW and FW motion vectors for a particular video block within the S frame from motion calculation unit 44. Interpolation selection unit 48 also receives the actual video blocks within the S frame $F_2$. Using the motion vectors, interpolation selection unit 48 applies a series of different interpolation equations and compares the results to the actual video block within the S frame $F_2$. In this manner, a set of different interpolation techniques are tested to predict the S-frame at encoder 12.

Upon selection of the interpolation equation yielding the best results, interpolation selection unit 48 generates an equation label for the applicable video block. The equation label identifies the particular interpolation equation to be used by decoder 14 for the pertinent video block. As output, interpolation selection unit 48 generates an equation label map that contains equation labels for all video blocks within the S frame. The map arranges the equation labels at locations corresponding to the video blocks within the S frame to facilitate processing by decoder 14.

A general equation for frame interpolation at decoder 14 can be expressed as:

$$F_2(x, y) = \alpha_1 F_1(x + mv_{12x}, y + mv_{12y}) + \alpha_2 F_1 (x + mv_{23x}, y + mv_{23y}) + \alpha_3 F_3 (x - mv_{23x}, y - mv_{23y}) + \alpha_4 F_3(x - mv_{12x}, y - mv_{12y}) \quad (1)$$

In the above equation (1), odd numbered P frames $F_1$ and $F_3$ are encoded with high fidelity, i.e., using both motion vectors and prediction error, whereas only motion vectors and other side information are sent for even numbered S frames. The values x, y represent the two-dimensional coordinate axes, while $\alpha_1$, $\alpha_2$, $\alpha_3$, and $\alpha_4$ represent weighting coefficients.

The skipped S frames are recovered by using FW motion vectors ($mv_{12}$) estimated between the preceding frame $F_1$ and the S frame $F_2$ and also using BW motion vectors ($mv_{23}$) estimated between the S frame $F_2$ and the subsequent frame $F_3$. The weighting coefficients ($\alpha$) are subject to $\Sigma_i \alpha_i = 1$ to keep the intensity values of the pixels normalized.

As discussed above, some interpolation equations may be more effective for particular video blocks within an S frame. Therefore, for encoder-assisted adaptive interpolation, interpolation selection unit 48 tests different equations to identify the most effective equation for interpolation of a particular S frame, or video block within an S frame, at the decoder side. As an example, the following equations may be derived from the general equation (1) and evaluated by interpolation selection unit 48 for encoder-assisted adaptive interpolation at the decoder 14:

$$F_2(x,y)=F_1(x+mv_{12x},y+mv_{12y}) \quad 1.$$

$$F_2(x,y)=F_3(x-mv_{23x},y-mv_{23y}) \quad 2.$$

$$F_2(x,y)=\tfrac{1}{2}F_1(x+mv_{12x},y+mv_{12y})+\tfrac{1}{2}F_3(x-mv_{23x},y-mv_{23y}) \quad 3.$$

$$F_2(x,y)=\tfrac{1}{3}F_1(x+mv_{12x},y+mv_{12y})+\tfrac{1}{3}F_1(x+mv_{23x},y+mv_{23y})+\tfrac{1}{3}F_3(x-mV_{23x},y-mv_{23y}) \quad 4.$$

$$F_2(x,y)=\tfrac{1}{4}F_1(x+mv_{12x},y+mv_{12y})+\tfrac{1}{4}F_1(x+mv_{23x},y+mv_{23y})+\tfrac{1}{4}F_3(x-mv_{23x},y-mv_{23y})+\tfrac{1}{4}F_3(x-mv_{12x},y-mv_{12y}) \quad 5$$

The equations above can be applied with $mv_{ab}{}'$ (i.e., processed motion vectors) instead of $mv_{ab}$ (i.e., transmitted motion vectors). In addition, the equations can be applied on a frame, on a macroblock or on a smaller block basis, e.g., 8×8 or 4×4, based on received decision flags.

Although five examples of interpolation equations from the general interpolation equation (1) have been described above, the number of interpolation equations may be greater or lesser. For example, additional equations can be created from the general interpolation equation (1) by varying the weighting coefficients or by using processed motion vectors as mentioned above. Additional equations can also be created by using more reference or future frames, e.g., at times t−3 or t+3.

The equation label map generated by interpolation selection unit 48 may be sent to decoder 14 in its entirety. In particular, frame assembly unit 42 may combine motion vectors generated by motion calculation unit 44, SAD flags generated by difference unit 46 and the entire equation label map generated by interpolation selection unit 48. In this case, the motion vectors, SAD flags, and equation label map form the S frame information 18 used by decoder 14.

As will be described, S frame information 18 may be sent as a special type of P frame or embedded as a field within a P frame. For example, each S frame can be either encoded as a particular type of P frame where there is no error residual coding, or encoded as side information without any video object plane (VOP) headers. In either case, the equation label map may require significant overhead in terms of the number of bytes of information that must be encoded. For this reason, the size of the equation label map may be reduced, as will be described in further detail.

Figures 4A, 4B, 4C:
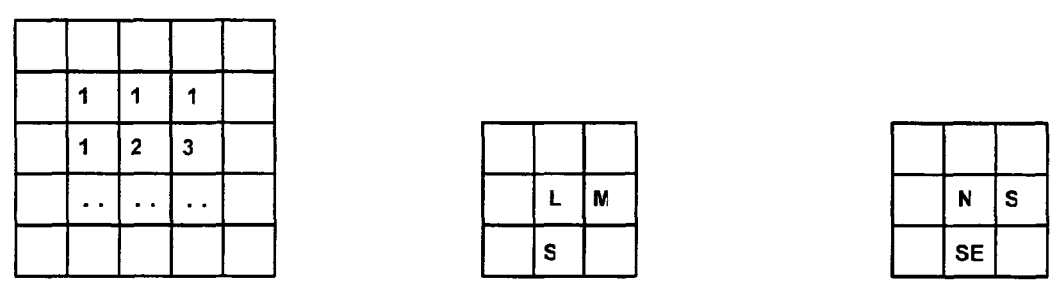

FIGS. 4A-4C are diagrams illustrating generation of equation flags and sum of absolute difference (SAD) flags to aid in adaptive interpolation. In particular, FIG. 4A illustrates interpolation equation flags, FIG. 4B illustrates SAD flags quantifying difference for an S frame block, and FIG. 4C illustrates SAD flags identifying neighboring blocks with greatest difference.

In FIG. 4A, flags 1, 2, 3, and the like identify particular interpolation equations to be used by decoder 14 for interpolation of the video blocks associated with the flags. In FIG. 4B, flags L, M, S indicate whether a SAD metric for a given video block is large, medium or small. In FIG. 4C, flags N, E, SE, etc. indicate north, east, and southeast directions pointing to neighboring blocks in which the SAD metric results in larger error. The flags in FIG. 4B categorize the SAD metric, while the flags in FIG. 4C act as directional flags indicating relative SAD values among neighboring blocks. Decoder 14 can use the flags in FIGS. 4A-4C as S frame information 18 to aid in interpolation of the S frame.

The number of bytes required for different components of the S frame can be significant, in terms of bandwidth. Accordingly, some efforts to reduce the amount of encoded information may be desirable. Table 1, below, demonstrates the number of bytes spent on headers and macroblock data for standard video test sequences, in quarter common intermediate format (QCIF) size, known to those of skill in the digital video arts, if S frames are encoded as a special case of P frame, i.e., with no error residual sent. The video test sequences are identified by name and are familiar to those of ordinary skill in the art of video encoding.

In Table 1, all video test sequences are encoded at 48 kilobits per second (kbps) with an MPEG-4 based CODEC with a rate control mechanism. The total frame rate is 10 frames per second (fps), where half of the frames per second are encoded as S frames using a method as described in this disclosure. The overhead of sending an equation label map for each S-frame is not included in the total bytes spent, but will be described later in this description.

TABLE 1

| | 5 + 5 fps with adaptive equation label map | |
|---|---|---|
| Test Video Sequence Name (at 48 kbps) | Average motion vector bytes per frame | Average motion vector + frame header bytes per frame |
| Akiyo (~100 frames) | 16.4 | 50.6 |
| Salesman (~100 frames) | 17.75 | 53.6 |
| Coastguard (~100 frames) | 72.73 | 135.5 |
| Carphone (~130 frames) | 69.26 | 125.93 |
| Foreman (~130 frames) | 94.3 | 156.7 |
| Stefan (~100 frames) | 99 | 164.45 |

As shown in Table 1, the overall cost of the forward motion vectors sent as side information in the special P frame is a 3 to 25% increase in the overhead, which needs to be transmitted. The backward motion vectors, i.e., $-mv_{23}$, are sent with the subsequent P frame, following the S frame information. The combined overhead, i.e., motion vectors, headers and macroblock data, is given in the last column of Table 1. The overhead increase for each standard test video sequence is as follows:

Akiyo: 3.4%
Salesman: 3.6%
Coastguard: 15%
Carphone: 18.5%
Foreman: 25%
Stefan: 20.6%.

In a low motion video test sequence such as Akiyo, the motion vector data occupies a small portion of the whole S-frame packet. Other than motion vectors, it is not necessary to send other data, such as quantization parameter (QP), macroblock types, and the like. Therefore, in this case, S-frame information including motion vectors and the equation label map should be appended as side information to the next P frame to avoid excessive overhead that comes from macroblock modes, macroblock level QP, and frame level QP.

As noted above, transmitting an S frame as an individual frame can result in consumption of a large number of bytes, including bytes that are unnecessary for S frame interpolation. More than half of the bytes in an individual S frame may be redundant. For example, the quantity of the redundant information can be calculated by the difference between the values in the second and third columns of Table 1. Accordingly, reduction in the amount of redundant S frame information may be desirable. One useful technique for reducing the amount of redundant information is to embed the S frame information within a P frame, as discussed above, rather than send a dedicated S frame.

Instead of sending unnecessary information, the S frame information needed to interpolate and thereby reconstruct the S-frame can be appended as side-information at the end of the P frame that follows the S frame. Overhead can be reduced in this manner because the S-frame will always use Inter macroblock mode so there is not any need to send a mode decision. In addition, because there is no need to send prediction error, there is also no need to send QP or any additional information. Hence, the S-Frame information can be sent as an embedded attachment to the next P frame.

Figure 5:
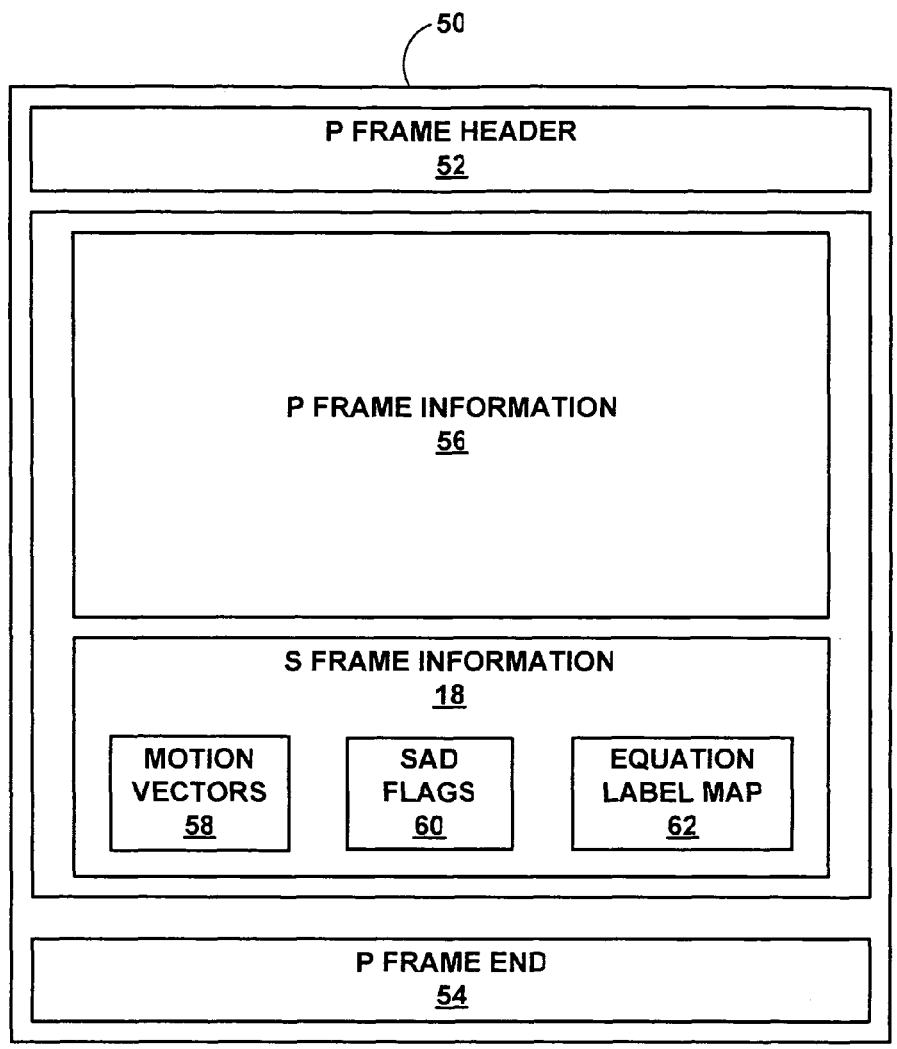
FIG. 5 is a diagram illustrating a P frame carrying embedded S frame information for use in encoder-assisted adaptive interpolation.

FIG. 5 is a diagram illustrating a P frame carrying embedded S frame information 18 for use in encoder-assisted adaptive interpolation. S frame information 18 can be encoded as side information without any VOP headers. Alternatively, as shown in FIG. 5, S frame information 18 may be embedded within a special P frame 50. In the example of FIG. 5, P frame 50 includes a P frame header 52, P frame end 54, P frame information 56, and S frame information 18 including motion vectors 58, SAD flags 60 and equation label map 62. S frame information 18 follows P frame information 56 and can be exploited by a decoder 14 equipped to handle S frame information, or discarded by a decoder that is not so equipped. Encoding the S frame information 18 can result in substantial overhead savings.

In addition to overhead associated with motion vectors, equation label map 62 within S frame information 18 also may present significant overhead. As an example, for an S frame in the standard Carphone video test sequence (at 48 kbps), if only motion compensated prediction is performed, i.e., with only motion vectors and no prediction error residual, the following result will be obtained:

Frame No: 12
Frame coding cost=127 bytes
Motion Compensated Prediction PSNR=30.103 dB
Motion vector size=561 bits (70.125 bytes)
VOP header=54 bits
Macroblock skip mode=14 bits
VOP end=3 bits
Other flags and QP=384 bits For purposes of illustration, it is assumed that only motion vectors and an equation label map are sent for 4×4 blocks, and that the equation label map consists of numbers from 1 to 3, which determine the numbers of particular equations to be selected for the respective 4×4 block for S-frame interpolation.

Figure 6:
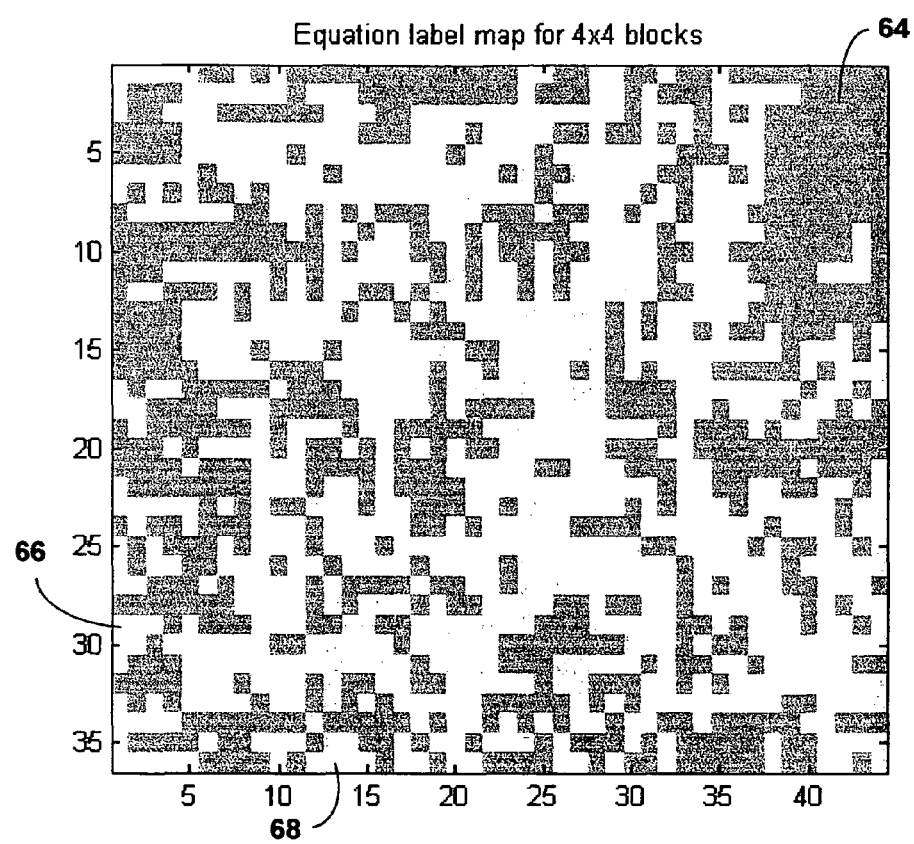
FIG. 6 is a diagram illustrating an interpolation equation label map for a skipped video frame.

FIG. 6 is a diagram illustrating the interpolation equation label map for the video frame described above, i.e., Carphone video frame 12. The equation label map of FIG. 6 can be used with motion vectors to perform motion compensated interpolation of the S frame. In this example, there are three different interpolation equations, identified by numbers 1 to 3 as follows:

$$\text{Label 1}: F_2(x,y) = F_1(x+mv_{12x}, y+mv_{12y}) \quad\quad 1.$$

$$\text{Label 2}: F_2(x,y) = F_3(x-mv_{23x}, y-mv_{23y}) \quad\quad 2.$$

$$\text{Label 3}: F_2(x,y) = \tfrac{1}{2}F_1(x+mv_{12x}, y+mv_{12y}) + \tfrac{1}{2}F_3(x-mv_{23x}, y-mv_{23y}) \quad\quad 3.$$

In the equation label map of FIG. 6, the total number of 4×4 vided blocks that are assigned equation label 1 is 689, the total number of blocks assigned equation label 2 is 528, and the number of blocks that are assigned equation label 3 is 367. Equation label 1 can be represented with "0" (1 bit), equation label 2 can be represented with "10" (2 bit), and equation label 3 can be represented with "1" (2 bit).

If the equation label map shown in FIG. 6 is sent as is without any compression or processing, then the resulting overhead is:

$$689 \times 1 + 528 \times 2 + 367 \times 2 = 2479 \sim 310 \text{ bytes}$$

The overhead number above is a worst case scenario for the situation in which no optimization is performed on the equation label map. This worst case number may not be acceptable for some practical applications subject to aggressive bandwidth limitations.

Upon closer inspection of the equation map, however, it is apparent that some of the 4×4 blocks in a close neighborhood have the same equation label. Therefore, blocks sharing the same equation label can be grouped and assigned a common equation label for the combined (larger) block. In FIG. 6, examples of blocks that can be grouped are identified by reference numerals 64, 66, 68. If the 4×4 blocks in the equation label map of FIG. 6 are grouped as 8×8 and 16×16 blocks, the following statistics are obtained.

1. Number of 16×16 blocks having same label=10 (5 blocks with equation label 1, 3 blocks with equation label 2, 2 blocks with equation label 3).
2. Number of 8×8 blocks having same label map=175 (only 135 blocks are different from 16×16, and include 60 blocks with equation label 1, 44 blocks with equation label 2, and 31 blocks with equation label 3).
3. Number of ungrouped 4×4 blocks that cannot be grouped with neighbors=884 (295 blocks with equation label 1, 246 blocks with equation label 2, 43 with equation label 3).

The total number of bytes for the equation map of FIG. 6, after grouping blocks sharing common equation labels, can be calculated approximately as:

| | |
|---|---|
| 16 × 16 blocks: | (5 + 3 × 2 + 2 × 2) |
| 8 × 8 blocks: | (60 × 1 + 44 × 2 + 31 × 2) |
| 4 × 4 blocks: | (295 × 1 + 246 × 2 + 43 × 2) |
| Total: | 137 bytes |

As demonstrated above, grouping of blocks sharing equation labels can result in substantial overhead savings (137 bytes vs. 310 bytes). Use of block grouping in S frame information 18, although viable, requires a mechanism to signal to decoder 14 that some of the blocks are grouped as 16×16, and some are grouped as 8×8. For example, a flag may be inserted within the equation label map of S frame information 18 to signal the onset of a set of group blocks, and the type of group, i.e., 16×16 or 8×8. Although this approach may be useful, the grouping flags will add further overhead to the 137-byte overhead noted above.

To avoid the need for block grouping, and associated signaling, another technique for reducing the overhead created by the equation label map may involve reduction of the size of the map. In particular, in some embodiments, equation labels may be encoded only for selected blocks that satisfy a difference criterion. With reference to FIG. 3, for example, difference threshold unit 40 may be provided to reduce the size of the equation label map. In this manner, equation labels can be sent for selected video blocks that comprise substantially less than all of the video blocks within the skipped video frame, thereby reducing the amount of encoded information sent to decoder 14.

Difference threshold unit 40 makes use of a correlation between forward and backward motion compensated prediction to locate particular blocks that require equation labels to be sent for effective interpolation. The result is a difference thresholded map that includes equation labels for only selected video blocks that exceed a difference threshold. Hence, the equation label map of FIG. 6 may be replaced by a map that does not include equation labels for all video blocks within an S frame, but rather a subset of the video blocks. Forward and backward predictions are available both at the encoder 12 and decoder 14. Consequently, there is no additional cost involved in sending the difference map.

In operation, difference threshold unit 40 obtains FW and BW motion vectors, which are used in the forward motion compensation of a reference frame and backward motion compensation of a future P frame. Difference threshold unit 40 calculates the difference between the FW and BW motion compensated frames and obtains a difference map, Dmap=ABS(FW−BW), where ABS stands for absolute value. Then, difference threshold unit 40 applies thresholding to the difference map to yield a region or regions in which the difference exceeds an applicable threshold value. The difference thresholded region may be noncontiguous.

As one example, the threshold value could be a value of 10 on a pixel scale of 0 to 255. Difference threshold unit 40 applies this threshold to the video blocks within the S frame to identify video blocks that could be particularly susceptible to interpolation error. The threshold may be applied to a complete equation label map output by interpolation unit 48 for all blocks within the S frame. Alternatively, the difference threshold could be applied beforehand so that interpolation selection unit 48 generates the equation label map only for blocks that satisfy the difference threshold. In either case, the equation label map actually encoded for transmission to decoder 14 is substantially reduced in size. In particular, only the blocks yielding a difference of greater than the threshold value are selected for equation labeling, thereby conserving bandwidth.

Upon application of the threshold value to identify a subset of the video blocks in the S frame, difference threshold unit 40 downscales the thresholded difference map to obtain a smaller map. According to this example, in the smaller map, each pixel value is replaced with the sum of the 4×4 corresponding pixel values in the original difference map. This downscaling step may be performed so that the size of the difference map matches the size of the equation label map. The scale factor in this example is chosen as 4, assuming that equation labels are sent for 4×4 blocks within the S frame. If the block size of the equation label map changes, the downscaling factor can be adjusted accordingly.

For each point in the downscaled thresholded difference map, difference threshold unit 40 selects the appropriate equation label. In particular, different threshold unit 40 selects the equation label identified by interpolation selection unit 48 for the applicable video block prior to downscaling. In some embodiments, the thresholding process may be an iterative process. For example, there may be frames yielding an excessive number of video blocks that exceed the application threshold value. In these cases, thresholding may initially result in insufficient bandwidth savings. For this reason, difference threshold unit 40 may be configured to adjust the threshold value if the downscaled thresholded difference map is too large.

As an example, difference threshold unit 40 may be configured to calculate the total number of bytes spent for equation labels following a first iteration of the difference thresholding process. If the total number of bytes exceeds a predetermined rate constraint R, then difference threshold unit 40 increases the threshold value used in the first iteration, and repeats the thresholding process using the newly computed threshold value.

The thresholding process may continue on an iterative basis, subject to an iteration limit, if desired, until the total number of bytes spent for equation labels is less than or equal to the rate constraint R. Upon completion of the thresholding process, difference threshold unit 40 stops and passes the equation label map to frame assembly unit 42. Frame assembly unit 42 packs the equation labels in raster scan order for inclusion in the S frame information 18 embedded in P frame 50 (FIG. 5).

Applying the difference threshold technique to the 12th frame of the standard Carphone video sequence, an equation label map packet with a size of 81 bytes can be obtained. For example, an interpolated frame obtained at the decoder side using the equation label map exhibits a PSNR of 31.72 dB, which is 0.2 dB less than in the case of a 300 byte equation map, but appears to present no noticeable visual difference.

Although encoding the entire Carphone sequence at 10 fps with a standard video codec, i.e., no frame skipping, provides a slightly higher PSNR (32.1 dB), individual frames still tend to show some artifacts. Without frame skipping, the total bytes spent for the 12th frame of the Carphone sequence at 10 fps is 538 bytes. In contrast, the total bytes spent for the same frame using encoder-assisted adaptive interpolation, as described herein, is 150 bytes, which includes 70 bytes for motion vectors and 80 bytes for a difference thresholded equation label map.

Figure 7:
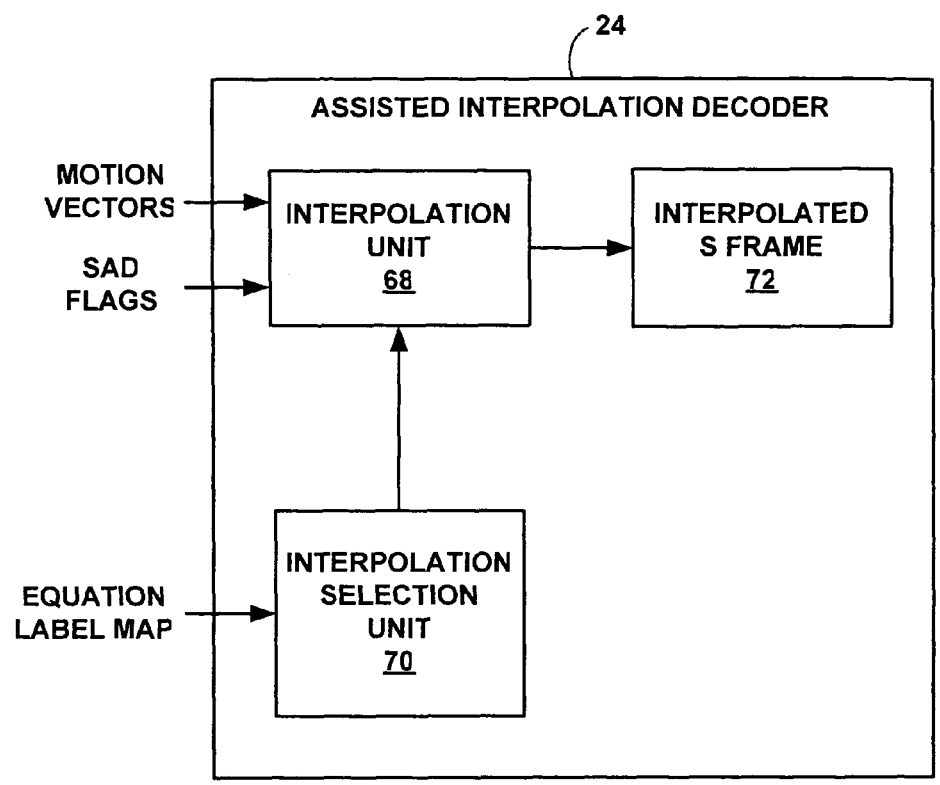
FIG. 7 is a block diagram illustrating an assisted interpolation decoder unit for use in a video decoder as shown in FIG. 1.

FIG. 7 is a block diagram illustrating an assisted interpolation decoder 24 for use in a video decoder 14 as shown in FIG. 1. As shown in FIG. 7, assisted interpolation decoder 24 includes an interpolation unit 68 and an interpolation equation selection unit 70 that operate to produce an interpolated S frame 72. Interpolation unit 68 receives S frame information in the form of motion vectors and SAD flags. Interpolation selection unit 70 receives S frame information in the form an equation label map. Using the equation label map, interpolation selection unit 70 identifies particular interpolation equations to be used by interpolation unit 68 for interpolation of frames or individual video blocks within a frame.

As discussed above, the equation label map may be difference thresholded. In this case, interpolation selection unit 70 may identify interpolation equations for only a subset of the video blocks within a frame. Interpolation unit 68 applies the motion vectors, SAD flags, and interpolation equations identified by interpolation selection unit 70 to produce interpolated video blocks. For video blocks not identified in the equation label map, interpolation unit 68 applies standard interpolation equations, rather than specifically selected interpolation equations. In either case, the result is an interpolated S frame 72.

Figure 8:
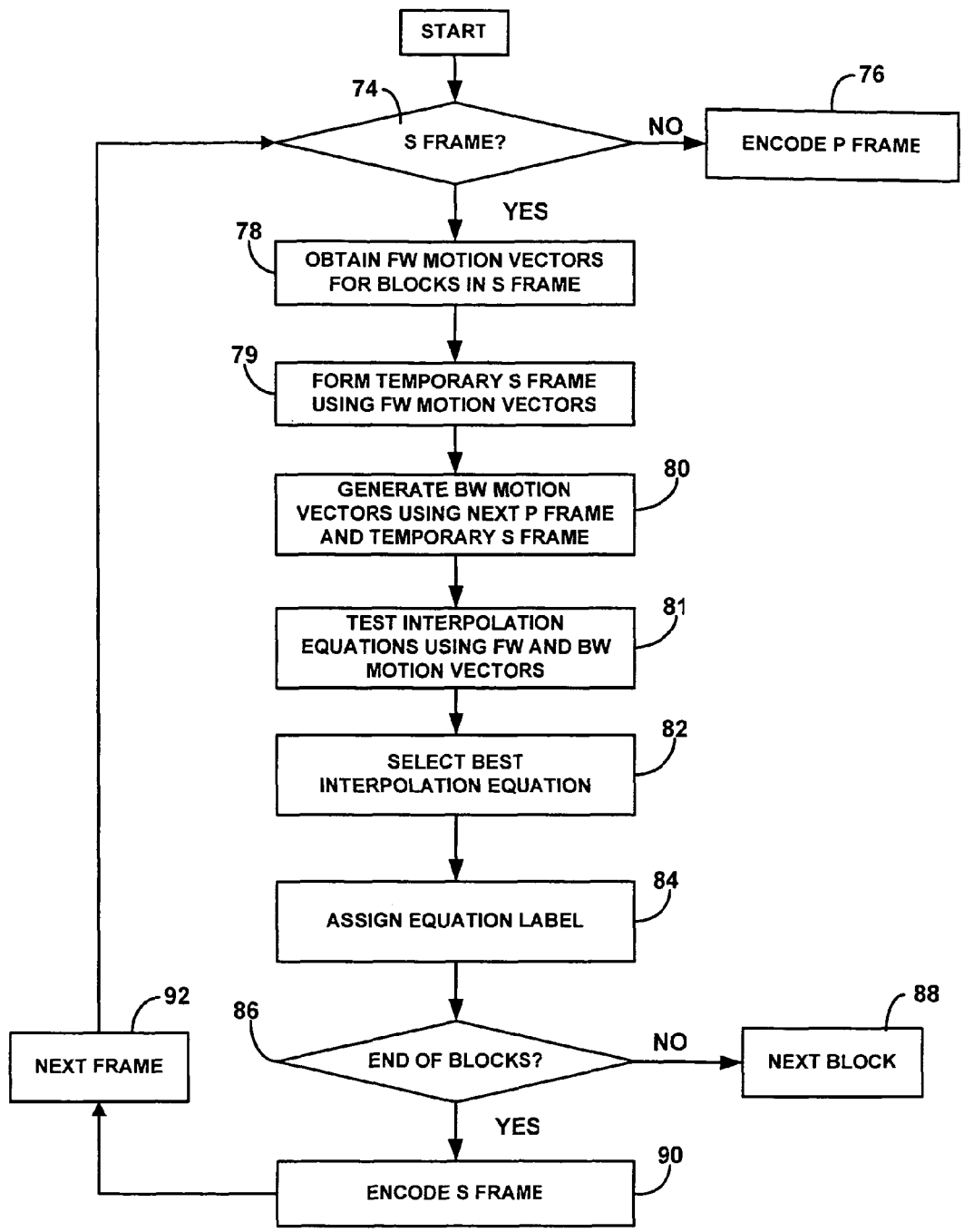
FIG. 8 is a flow diagram illustrating a technique for generation of information to assist a decoder in interpolation of skipped frames.

FIG. 8 is a flow diagram illustrating a technique for generation of information to assist decoder 14 in interpolation of skipped frames. In general, the technique illustrated in FIG. 8 is performed by encoder 12 to generate S frame information for encoder-assisted adaptive interpolation of S frames by decoder 14. As shown in FIG. 8, if the next video frame to be processed is not an S frame (74), encoder 12 encodes a P frame (76). When the next frame to be encoded is an S frame (74), however, encoder 12 generates S frame information. In particular, motion calculation unit 44 of S frame analysis unit 38 obtains forward (FW) motion vectors $mv_{12}$ (78) between corresponding video blocks in the preceding P frame ($F_1$) and the S frame ($F_2$), and forms a temporary S frame using the FW motion vectors (79). Using the temporary S frame and the next P frame ($F_3$), motion calculation unit 44 generates backward (BW) motion vectors $m_{23}$ (80). With the BW motion vectors $m_{23}$ and the addition of prediction error, the next P frame is predicted. Then, the S frame can be interpolated using $mv_{12}$, the preceding P frame $F_1$, $mv_{23}$, and the subsequent P frame $F_3$.

Interpolation selection unit 48 then tests a plurality of different interpolation equations (81) for individual video blocks within the frame using the FW and BW motion vectors. Based on the result of the interpolation equations, interpolation selection unit 48 selects the best interpolation equation (82) and assigns an equation label (84) to the respective video block. The "best" interpolation equation is the particular equation, among the several interpolation equations tested, that produces the most accurate interpolation results. The equation label serves to identify the particular interpolation equation that should be used by decoder 14 for interpolation of the associated video block.

The process continues iteratively for all blocks within the S frame (86, 88) until the end of the blocks is reached. Alternatively, in some embodiments, difference thresholding may be applied before equation testing to identify a subset of the blocks as candidates for encoder-assisted interpolation.

Once all blocks have been processed, interpolation selection unit 48 passes an equation label map to encode the S frame (90), e.g., as a dedicated S frame or as S frame information embedded with a preceding or subsequent P frame. The FW motion vectors are also included in the S frame information, as well as SAD flags. However, the BW motion vectors are not typically included in the S frame information because they can be obtained at the decoder side from the next P frame that follows the S frame. Again, the equation label map may be processed by difference threshold unit 40 to reduce the overall number of bytes required by the equation label map. Upon assembly of the S frame information, the process proceeds to the next frame (92).

Figure 9:
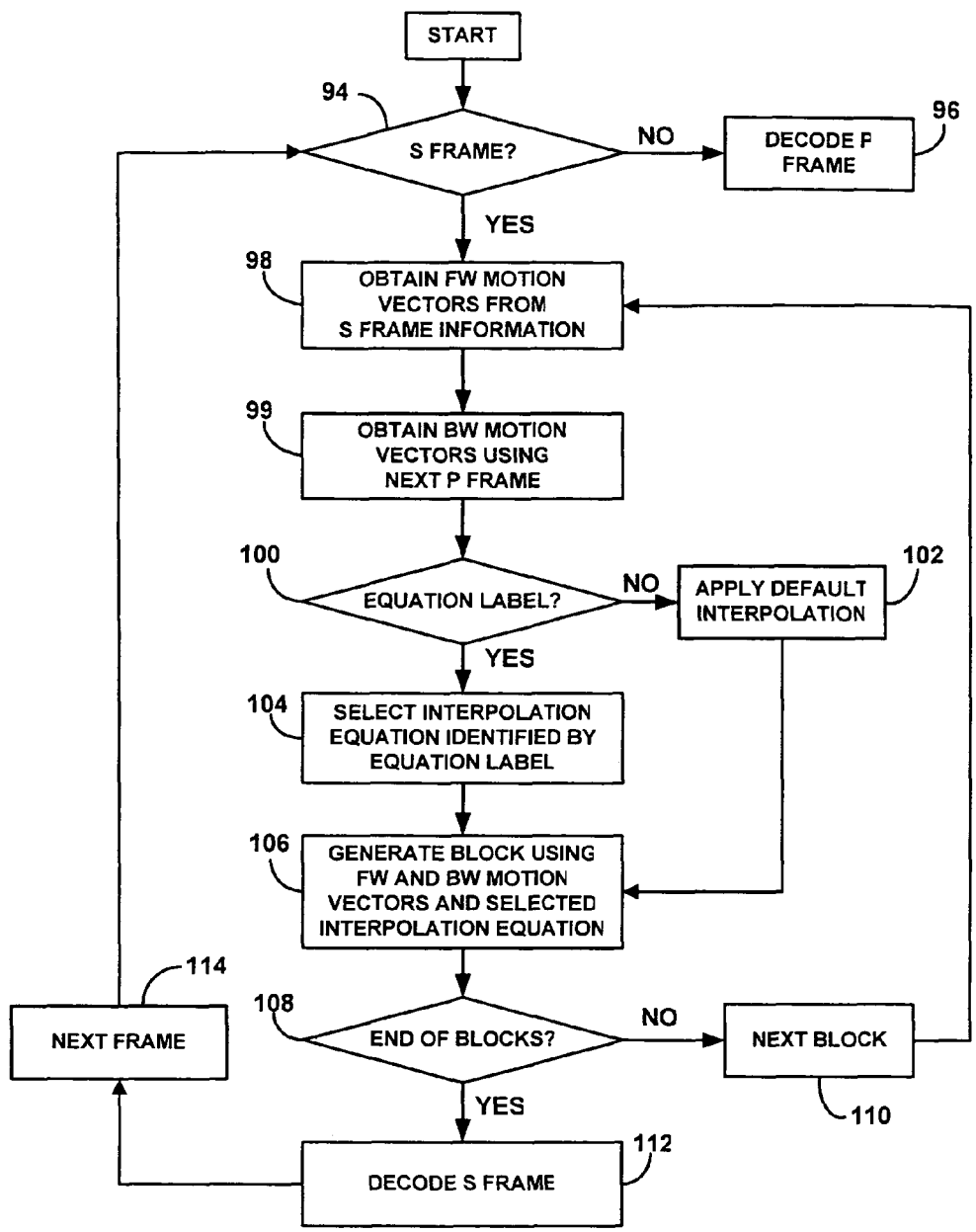
FIG. 9 is a flow diagram illustrating application of information provided by an encoder in interpolation of skipped frames.

FIG. 9 is a flow diagram illustrating application of information provided by an encoder 12 in interpolation of skipped frames at decoder 14. As shown in FIG. 9, if an incoming frame to be decoded is not an S frame (94), it is decoded as a P frame (96) using ordinary decoding processes. If the incoming frame is an S frame (94), however, decoder 14 obtains FW motion vectors (98) from S frame information provided in the encoded video information, and obtains BW motion vectors using the next P frame (99). In particular, the BW motion vectors are obtained from motion vectors estimated for the P frame that follows the S frame. Although the BW motion vectors may be estimated for the S frame by changing the reference frame, the cost of sending the BW motion vectors is high. For this reason, it is desirable to use a negative version of the BW motion vectors $mv_{23}$ obtained from the next P frame.

Decoder 14 next determines whether the S frame information includes an equation label (100) for each video block. If there is no equation label for a video block (100), decoder 14 applies a default interpolation equation (102) to interpolate the video block. If the S frame information includes an equation label for a video frame, however, decoder 14 selects the interpolation equation identified by the equation label (104). Decoder 14 then generates the block by interpolation using the FW and BW motion vectors and the selected interpolation equation (106). The process continues iteratively (108, 110) until the end of the blocks in the S frame is reached. On the basis of the decoded blocks, decoder 14 produces a decoded S frame (112) and proceeds to the next frame (114).

Figure 10:
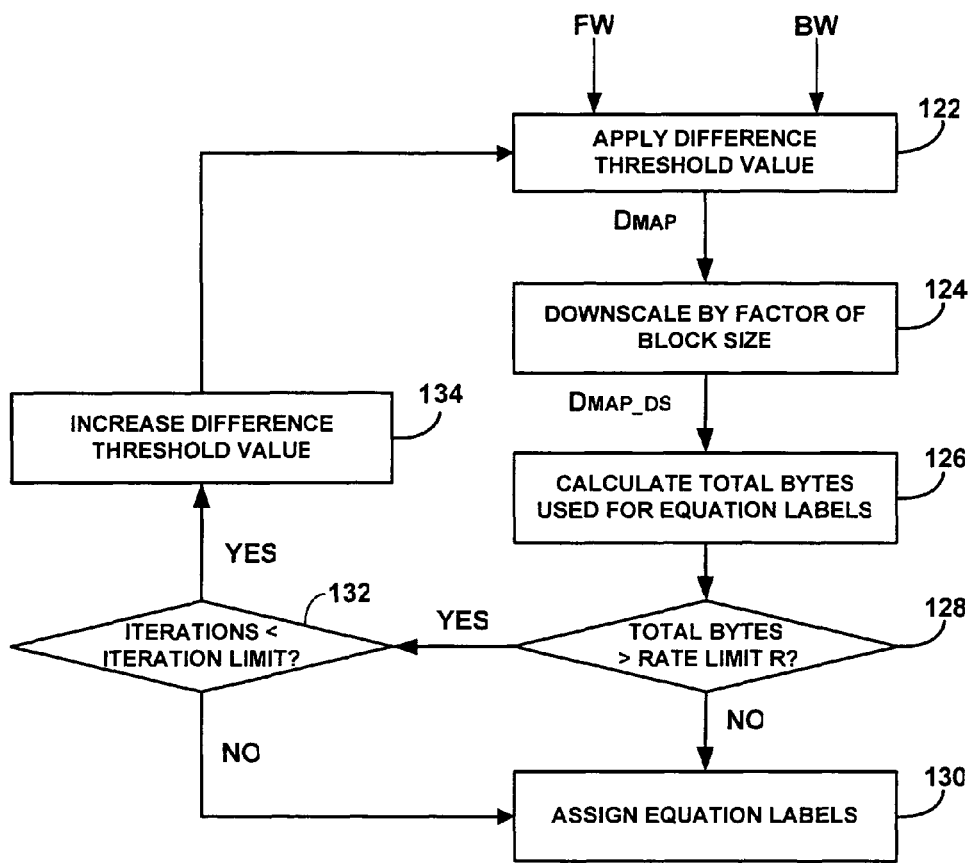
FIG. 10 is a flow diagram illustrating a bandwidth-conserving technique for generation of information to assist a decoder in interpolation of skipped frames.

FIG. 10 is a flow diagram illustrating a bandwidth-conserving technique for generation of information to assist a decoder 12 in interpolation of skipped frames, as described above. As shown in FIG. 10, different threshold unit 40 receives BW and FW motion vectors for blocks within an S frame. Again, the BW motion vector is used for backward motion compensation for the frame following the S frame, while the FW motion vector is used for the forward motion compensation for the frame that precedes the S frame. Difference threshold unit 40 applies a difference threshold value (122) to the difference between the BW and FW motion compensated frames to produce the thresholded difference map, DMAP. In some embodiments, the thresholded difference map, DMAP, may be downscaled by a factor of video block size (124), to produce downscaled map $D_{MAP\_DS}$.

Once the downscaled thresholded difference map $D_{MAP\_DS}$ is obtained, difference threshold unit 40 embarks on an iterative process to reduce the number of bytes consumed by equation labels to an acceptable level. As shown in FIG. 10, difference threshold unit 40 first calculates the total number of bytes used for equation labels (126). If the total number of bytes is less than the rate limit R (128), the equation labels are assigned (130) and the resulting equation label map is passed to frame assembly unit 42, along with other S frame information such as motion vectors and SAD flags.

If the total number of bytes consumed by equation labels is greater than the rate limit R (128), however, and the number of iterations has not yet exceeded an applicable iteration limit (132), then difference threshold unit 40 increases the difference threshold value (134), and repeats the difference thresholding process. The iterations continue until the total number of bytes is less than or equal to the rate limit R (128), or the number of permitted iterations has been exceeded (132). In either case, difference threshold unit 40 then assigns the equation labels to the selected blocks, and passes the result to frame assembly unit 42 for encoding.

In the technique described in this disclosure, motion estimation is performed for blocks within the S frame, and the best interpolation equation is chosen for each block based on the error of the interpolation result. In accordance with this technique, there is no need for higher complexity motion estimation algorithms such as bidirectional motion estimation. In addition, there is no need to send multiple sets of motion vectors, or residual error. With difference thresholding, the disclosed technique may permit small block sizes as low as 2×2 pixels without the need for extra overhead, because equation labels can be sent for 2×2 blocks, if desired, even though motion estimation can be performed for 16×16 blocks.

In general, the encoder-assisted adaptive interpolation techniques described in this disclosure provide effective side information such as an equation label map, motion vectors, and SAD flags for S frames to assist interpolation at the decoder. In some embodiments, the techniques permit an equation label map to be set in a manner that reduces the overhead cost associated with the equation information. To send the equation label map, a method is proposed to reduce the overhead cost of this extra information. It is conceivable that the techniques described herein could support a new B-frame mode for the emerging ITU H.264 standard. Further, the techniques may be used not only in uniformly sampled frame skipping, but also in non-uniform frame skipping. In addition, the techniques can be used not only for frame rate up conversion applications, but also in frame skipping for rate control.

The techniques described herein may be implemented in hardware, software, firmware, or any combination thereof. If implemented in software, the techniques may be realized in part by a computer readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In some embodiments, the functionality described herein may be provided within dedicated software modules or hardware units configured for encoding and decoding, or incorporated in a combined video encoder-decoder (CODEC).

Various embodiments have been described. These and other embodiments are within the scope of the following claims.

The invention claimed is:

1. A video decoding method comprising:
receiving information encoding a video frame;
deciding whether said video frame is an intentionally skipped video frame based on one or more dynamic frame skipping criteria, said information comprising motion vectors encoding blocks of the video frame and further information specifying one or more interpolation techniques to assist in interpolation of one or more video blocks within said video frame if said video frame is an intentionally skipped video frame; and
applying the information to interpolate said one or more video blocks of the intentionally skipped video frame using said one or more interpolation techniques, wherein said one or more interpolation techniques include one or more motion calculations using one or more forward motion vectors and one or more backward motion vectors, wherein said one or more forward motion vectors are included in the information for the intentionally skipped video frame, and wherein said one or more backward motion vectors are not included in the information for the intentionally skipped video frame but are included in information for a predictive video frame received subsequent to the intentionally skipped video frame.

2. The method of claim 1, wherein the information specifies a single interpolation equation to be used in interpolation of all of the video blocks within the intentionally skipped video frame, the method further comprising applying the specified interpolation equation to interpolate all of the video blocks within the intentionally skipped video frame.

3. The method of claim 1, wherein the information specifies different interpolation equations to be used in interpolation of selected video blocks within the intentionally skipped video frame, the method further comprising applying the specified different interpolation equations to interpolate the selected video blocks within the intentionally skipped video frame.

4. The method of claim 3, wherein the selected video blocks comprise substantially less than all of the video blocks within the intentionally skipped video frame, thereby reducing an amount of the information.

5. The method of claim 1, wherein the information includes an equation label map specifying different interpolation equations to be used in interpolation of selected video blocks within the intentionally skipped video frame, the method further comprising applying the specified interpolation equations to interpolate the selected video blocks within the intentionally skipped video frame.

6. The method of claim 1, wherein the information specifies interpolation equations to be used in interpolation of selected video blocks within the intentionally skipped video frame, and wherein differences between the selected video blocks within the intentionally skipped video frame and corresponding video blocks within another video frame exceed a threshold value.

7. The method of claim 1, wherein the information includes motion vectors representing motion between the intentionally skipped video frame, a previous frame, and a subsequent frame, the method further comprising applying the motion vectors to interpolate the intentionally skipped video frame.

8. The method of claim 1, wherein the information includes difference flags indicating differences between the intentionally skipped video frame, a previous frame, and a subsequent frame, the method further comprising applying the difference flags to interpolate the intentionally skipped video frame.

9. The method of claim 8, wherein the difference flags include sum of absolute difference (SAD) flags and directional flags indicating relative SAD values among neighboring blocks.

10. A video decoder comprising an interpolation unit that receives information encoding a video frame, decides whether said video frame is an intentionally skipped video frame based on one or more dynamic frame skipping criteria, said information comprising motion vectors encoding blocks of the video frame and further information specifying one or more interpolation techniques to assist in interpolation of one or more video blocks within said video frame if said video frame is an intentionally skipped video frame, and applies the information to interpolate said one or more video blocks of the intentionally skipped video frame using said one or more interpolation techniques, wherein said one or more interpolation techniques include one or more motion calculations using one or more forward motion vectors and one or more backward motion vectors, wherein said one or more forward motion vectors are included in the information for the intentionally skipped video frame, and wherein said one or more backward motion vectors are not included in the information for the intentionally skipped video frame but are included in information for a predictive video frame received subsequent to the intentionally skipped video frame.

11. The video decoder of claim 10, wherein the information specifies a single interpolation equation to be used in interpolation of all of the blocks within the intentionally skipped video frame.

12. The video decoder of claim 10, wherein the information specifies different interpolation equations to be used in interpolation of selected video blocks within the intentionally skipped video frame.

13. The video decoder of claim 12, wherein the selected video blocks comprise substantially less than all of the video blocks within the intentionally skipped video frame, thereby reducing an amount of the information.

14. The video decoder of claim 10, wherein the information includes an equation label map specifying different interpolation equations to be used in interpolation of selected video blocks within the intentionally skipped video frame.

15. The video decoder of claim 10, wherein the information specifies interpolation equations to be used in interpolation of selected video blocks within the intentionally skipped video frame, and wherein differences between the selected video blocks within the intentionally skipped video frame and corresponding video blocks within another video frame exceed a threshold value.

16. The video decoder of claim 10, wherein the information includes motion vectors representing motion between the intentionally skipped video frame, a previous frame, and a subsequent frame.

17. The video decoder of claim 10, wherein the information includes difference flags indicating differences between the intentionally skipped video frame, a previous frame, and a subsequent frame.

18. The video decoder of claim 17, wherein the difference flags include sum of absolute difference (SAD) flags and directional flags indicating relative SAD values among neighboring blocks.

19. A video decoder comprising:
means for receiving information encoding a video frame;
means for deciding whether said video frame is an intentionally skipped video frame based on one or more dynamic frame skipping criteria, said information comprising motion vectors encoding blocks of the video frame and further information specifying one or more interpolation techniques to assist in interpolation of one or more video blocks within said video frame if said video frame is an intentionally skipped video frame; and
means for applying the information to interpolate said one or more video blocks of the intentionally skipped video frame using said one or more interpolation techniques, wherein said one or more interpolation techniques include one or more motion calculations using one or more forward motion vectors and one or more backward motion vectors, wherein said one or more forward motion vectors are included in the information for the intentionally skipped video frame, and wherein said one or more backward motion vectors are not included in the information for the intentionally skipped video frame but are included in information for a predictive video frame received subsequent to the intentionally skipped video frame.

20. The video decoder of claim 19, wherein the information specifies a single interpolation equation to be used in interpolation of all of the video blocks within the intentionally skipped video frame, the video decoder further comprising means for applying the specified interpolation equation to interpolate all of the video blocks within the intentionally skipped video frame.

21. The video decoder of claim 19, wherein the information specifies different interpolation equations to be used in interpolation of selected video blocks within the intentionally skipped video frame, the video decoder further comprising means for applying the specified different interpolation equations to interpolate the selected video blocks within the intentionally skipped video frame.

22. The video decoder of claim 21, wherein the selected video blocks comprise substantially less than all of the video blocks within the intentionally skipped video frame, thereby reducing an amount of the information.

23. The video decoder of claim 19, wherein the information includes an equation label map specifying different interpolation equations to be used in interpolation of selected video blocks within the intentionally skipped video frame, the video decoder further comprising means for applying the specified interpolation equations to interpolate the selected video blocks within the intentionally skipped video frame.

24. The video decoder of claim 19, wherein the information specifies interpolation equations to be used in interpolation of selected video blocks within the intentionally skipped video frame, and wherein differences between the selected video blocks within the intentionally skipped video frame and corresponding video blocks within another video frame exceed a threshold value.

25. The video decoder of claim 19, wherein the information includes motion vectors representing motion between the intentionally skipped video frame, a previous frame, and a subsequent frame, the video decoder further comprising means for applying the motion vectors to interpolate the intentionally skipped video frame.

26. The video decoder of claim 19, wherein the information includes difference flags indicating differences between the intentionally skipped video frame, a previous frame, and a subsequent frame, the video decoder further comprising means for applying the difference flags to interpolate the intentionally skipped video frame.

27. The video decoder of claim 26, wherein the difference flags include sum of absolute difference (SAD) flags and directional flags indicating relative SAD values among neighboring blocks.

28. A computer-readable medium having stored thereon instructions to cause a processor to:
receive information encoding a video frame;
decide whether said video frame is an intentionally skipped video frame based on one or more dynamic frame skipping criteria, said information comprising motion vectors encoding blocks of the video frame and further information specifying one or more interpolation techniques to assist in interpolation of one or more video blocks within said video frame if said video frame is an intentionally skipped video frame; and
apply the information to interpolate said one or more video blocks of the intentionally skipped video frame using said one or more interpolation techniques, wherein said one or more interpolation techniques include one or more motion calculations using one or more forward motion vectors and one or more backward motion vectors, wherein said one or more forward motion vectors are included in the information for the intentionally skipped video frame, and wherein said one or more backward motion vectors are not included in the information for the intentionally skipped video frame but are included in information for a predictive video frame received subsequent to the intentionally skipped video frame.

29. The computer readable medium of claim 28, wherein the information specifies a single interpolation equation to be used in interpolation of all of the video blocks within the intentionally skipped video frame, the video decoder further comprising means for applying the specified interpolation equation to interpolate all of the video blocks within the intentionally skipped video frame.

30. The computer readable medium of claim 28, wherein the information specifies different interpolation equations to be used in interpolation of selected video blocks within the intentionally skipped video frame, the video decoder further comprising means for applying the specified different interpolation equations to interpolate the selected video blocks within the intentionally skipped video frame.

31. The computer readable medium of claim 30, wherein the selected video blocks comprise substantially less than all of the video blocks within the intentionally skipped video frame, thereby reducing an amount of the information.

32. The computer readable medium of claim 28, wherein the information includes an equation label map specifying different interpolation equations to be used in interpolation of selected video blocks within the intentionally skipped video frame, the video decoder further comprising means for applying the specified interpolation equations to interpolate the selected video blocks within the intentionally skipped video frame.

33. The computer readable medium of claim 28, wherein the information specifies interpolation equations to be used in interpolation of selected video blocks within the intentionally skipped video frame, and wherein differences between the selected video blocks within the intentionally skipped video frame and corresponding video blocks within another video frame exceed a threshold value.

34. The computer readable medium of claim 28, wherein the information includes motion vectors representing motion between the intentionally skipped video frame, a previous frame, and a subsequent frame, the video decoder further comprising means for applying the motion vectors to interpolate the intentionally skipped video frame.

35. The computer readable medium of claim 28, wherein the information includes difference flags indicating differences between the intentionally skipped video frame, a previous frame, and a subsequent frame, the video decoder further comprising means for applying the difference flags to interpolate the intentionally skipped video frame.

36. The computer readable medium of claim 35, wherein the difference flags include sum of absolute difference (SAD) flags and directional flags indicating relative SAD values among neighboring blocks.

* * * * *